United States Patent
Kitano et al.

(10) Patent No.: US 12,137,718 B2
(45) Date of Patent: Nov. 12, 2024

(54) INSTANT FRIED NOODLES

(71) Applicant: NISSIN FOODS HOLDINGS CO., LTD., Osaka (JP)

(72) Inventors: Sho Kitano, Osaka (JP); Maiko Tanahashi, Osaka (JP); Eriko Kanai, Osaka (JP); Hidenobu Hazama, Osaka (JP); Mitsuru Tanaka, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 1467 days.

(21) Appl. No.: 15/512,394

(22) PCT Filed: Jul. 20, 2016

(86) PCT No.: PCT/JP2016/071293
§ 371 (c)(1),
(2) Date: Mar. 17, 2017

(87) PCT Pub. No.: WO2017/043187
PCT Pub. Date: Mar. 16, 2017

(65) Prior Publication Data
US 2017/0280753 A1    Oct. 5, 2017

(30) Foreign Application Priority Data
Sep. 11, 2015  (JP) .................. 2015-179457

(51) Int. Cl.
*A23L 7/109* (2016.01)
*A23L 5/10* (2016.01)
*A23L 7/113* (2016.01)

(52) U.S. Cl.
CPC ............... *A23L 7/111* (2016.08); *A23L 5/11* (2016.08); *A23L 7/113* (2016.08)

(58) Field of Classification Search
CPC ............ A23L 7/111; A23L 7/113; A23L 5/11
See application file for complete search history.

(56) References Cited

U.S. PATENT DOCUMENTS 4,243,689 A * 1/1981 Kokeguchi ............ A23L 7/109
                                                    426/242
4,988,528 A   1/1991 Tomoda
(Continued)

FOREIGN PATENT DOCUMENTS

CN    1409991     4/2003
CN    102843917   12/2012
(Continued)

OTHER PUBLICATIONS

"Fine" Retrieved Apr. 10, 2021 https://www.merriam-webster.com/dictionary/fine (Year: 2021).*
(Continued)

*Primary Examiner* — Katherine D Leblanc
(74) *Attorney, Agent, or Firm* — HSML P.C.

(57) ABSTRACT

[Problem to be Solved]
An object of the present invention is to provide instant fried noodles having a lower fat or oil content than general instant fried noodles.
[Solution]
Instant fried noodles having a porous structure including a smaller number of pores and having a lower porosity are provided by inhibiting formation of a layered gluten network structure within noodle strings. Thus, a fat or oil content of the fried noodles can be lowered.

4 Claims, 7 Drawing Sheets

(56) References Cited

U.S. PATENT DOCUMENTS

| | | | | |
|---|---|---|---|---|
| 6,042,866 A | * | 3/2000 | Greene | A23L 7/111 426/451 |
| 6,042,886 A | | 3/2000 | Matthee et al. | |
| 2010/0323070 A1 | | 12/2010 | Seto et al. | |
| 2011/0318466 A1 | | 12/2011 | Nagayama | |
| 2012/0288607 A1 | | 11/2012 | Takahashi et al. | |
| 2013/0115359 A1 | * | 5/2013 | Kanayama | A23L 7/113 426/557 |
| 2013/0251875 A1 | | 9/2013 | Minamitani et al. | |
| 2014/0093631 A1 | * | 4/2014 | Zhou | A23L 29/015 426/557 |
| 2015/0086689 A1 | | 3/2015 | Machida et al. | |
| 2016/0007617 A1 | | 1/2016 | Wang | |
| 2016/0249652 A1 | | 9/2016 | Tanaka et al. | |

FOREIGN PATENT DOCUMENTS

| | | |
|---|---|---|
| CN | 103535617 | 1/2014 |
| CN | 104473042 | 4/2015 |
| EP | 2 548 451 | 1/2013 |
| EP | 3 053 455 | 8/2016 |
| JP | S26-001092 Y | 2/1951 |
| JP | S27-005490 Y | 6/1952 |
| JP | S31-005687 Y | 4/1956 |
| JP | S35-001495 Y | 1/1960 |
| JP | S35-016975 B | 11/1960 |
| JP | S58-216657 | 12/1983 |
| JP | H07-274874 | 10/1995 |
| JP | 9-294553 | 11/1997 |
| JP | H10-117715 | 5/1998 |
| JP | 2000-245377 | 9/2000 |
| JP | 2003-102413 | 4/2003 |
| JP | 3950603 B | 8/2007 |
| JP | 2008-278788 | 11/2008 |
| JP | 2010-207107 | 9/2010 |
| JP | 5039716 B | 10/2012 |
| JP | 2013-215146 | 10/2013 |
| JP | 2016-015969 | 2/2016 |
| WO | 2012/039495 | 3/2012 |
| WO | 2015/050121 | 4/2015 |

OTHER PUBLICATIONS

English translation of JP 2008/278788A (Year: 2008).*
English Translation of JP 2008-278788 published Nov. 20, 2008 provided by USPTO Translator on Sep. 25, 2023 (Year: 2008).*
Extended European Search Report issued in corresponding European Patent Application No. 16843284.7, Apr. 4, 2019, 9 pages.
World foods from Japan, All about Instant Noodles, The Japan Food Journal, Co., Ltd., Dec. 20, 2004, pp. 50-81, with an English concise explanation.
Office Action issued in the corresponding Brazilian patent application No. 112017005642-9, Dec. 11, 2019, 7 pages including English translation.
Third party submission for the corresponding Japanese patent application No. 2015-179457, Nov. 24, 2020, 35 pages including English summary.
Analysis test result (fat content) Japan Food Research Laboratories, Oct. 22, 2020, 2 pages including English translation.
Kinno et al., "Certification of Multiple Binarization Imaging Method Using Bread-Crumb Imitating Boards and Its Application to Digital Image Analysis of Crumb Grain of Commercial White Pan Breads," Nippon Shokuhin Kagaku Kogaku Kaishi, vol. 57, No. 12, p. 517-524 (2010); Partial translation is provided.
Igarashi, Visualization of pore structure, Concrete Journal, Japan Concrete Institute, vol. 53, No. 5, 2015. 5, p. 388-393; Partial translation is provided.
Honda et al., Image Binarization Based on Digital Flow Analysis, The Journal of the Institute of Image Electronics Engineers of Japan vol. 44, No. 4 (2015), p. 657-664; Partial translation is provided.
Image-Pro Premier ver. 9.3 Quick Start Guide, Media Cybernetcis,<URL:http://mediacy.jp/download/duwn_manuals.htm#Premier>; English counterpart guide is provided.
Office Action issued for the Chinese Patent Application No. 201680002742.5, Sep. 28, 2020, 13 pages including machine translation.
Office Action issued for the Japanese patent application No. 2020-137348 mailed on May 25, 2021, 16 pages including machine translation.
Third Party Observation for the Japanese patent application No. 2020-137348 received on Apr. 15, 2021, 10 pages Including English summary.
Analysis test result, Japan Food Research Laboratories, Mar. 17, 2021, 10 pages including English translation.

* cited by examiner

INSTANT FRIED NOODLES

TECHNICAL FIELD

The present invention relates to instant fried noodles.

BACKGROUND ART

Instant noodles can be roughly divided into fried noodles and non-fried noodles. The fried noodles are produced by gelatinizing raw noodles, and drying the gelatinized noodles by performing a frying process in an oil at a temperature about 150° C. On the other hand, the non-fried noodles are produced by gelatinizing raw noodles and drying the gelatinized noodles by a method excluding the frying process performed in an oil. There are several methods for producing the non-fried noodles, and a hot-air drying method in which raw noodles are exposed to hot air at an air velocity of about 4 m/s or less and at about 70 to 100° C. for about 30 to 90 minutes for drying the noodles is generally employed (for example, Patent Literature 1).

The fried noodles have high reconstitutability because moisture within the noodles evaporate during the frying process to form a porous structure and are characterized by snack-like flavor derived from an oil peculiar to the fried noodles, and a variety of fried noodles are now commercially available as instant noodles sold in plastic bags or cups. The fried noodles contain, however, a large amount of oils, and hence have a higher calorie content than the non-fried noodles. Therefore, attempts have been made for developing fried noodles having a reduced fat or oil content.

Patent Literature 2 describes the following technique as a method for producing fried noodles having a reduced fat or oil content and free from browning caused by kansui: Dough with pH 7.5 to 8.5 is prepared by mixing 0.3 to 0.6% by weight of sodium carbonate and/or potassium carbonate and an acidic substance with a noodle material powder, raw noodle strings are obtained by extruding or rolling out the dough and cutting the resultant, and then, the raw noodle strings are steamed, flavored and dried by frying. This method is an excellent method for reducing a fat or oil content of fried noodles, but it is necessary to use large amounts of kansui and the acidic substance for pH adjustment.

CITATION LIST

Patent Literature

Patent Literature 1: Japanese Patent No. 3950603
Patent Literature 2: Japanese Patent No. 5039716

SUMMARY OF INVENTION

Technical Problem

An object of the present invention is to provide instant fried noodles having a characteristic that a fat or oil content is low owing to a small number of pores and a low porosity.

Solution to Problem

As a result of earnest studies on the relationship between a porous structure of noodle strings and a fat or oil content of instant fried noodles, the inventors have found that a layered gluten network structure is formed within a noodle belt when rolled out, and that the number of pores included in the porous structure of a noodle string is reduced and a fat or oil content is reduced by inhibiting the formation of the layered gluten network structure, resulting in inventing instant fried noodles having a low fat or oil content.

Specifically, the present invention provides instant fried noodles having a porous structure in which the number of pores of 100 μm$^2$ or larger present per unit area of 1 mm$^2$ in a cross section of each noodle string cut in a direction perpendicular to the lengthwise direction of the noodle string is 250 or less, and more preferably 150 or less.

A total area of the pores of 100 μm$^2$ or larger present in the cross section of the noodle string is 25% or less, and more preferably 19% or less of an area of the cross section of the noodle string (porosity).

An average area of the pores of 100 μm$^2$ or larger present in the cross section of the noodle string is 0.14% or less of the area of the cross section of the noodle string (average porosity).

A fat or oil content of the noodle string is 15% or less, and more preferably 13% or less.

The fried noodles of the present invention have the above-described porous structure, and hence, its fat or oil content can be reduced without causing a blister on the surface of the noodle string.

DESCRIPTION OF EMBODIMENTS

The present invention will now be described in detail. It is noted that the type of instant fried noodles of the present invention is not particularly limited, and in general, can be any of those own in this technical field. Examples include udon (Japanese wheat noodles), soba (buckwheat noodles), Chinese noodles and pastas.

The instant fried noodles of the present invention are produced, for example, as follows: Dough is first prepared by using a normal pressure mixer or a vacuum mixer, and then, the dough is formed into a noodle belt by any of the following methods (1) to (3): (1) The dough is formed into a crude noodle belt by using a usual shaping roll and the resultant is allowed to pass through a compound roll to prepare the noodle belt (usual compounding); (2) the dough is extruded under ordinary pressure by using an extruding machine such as an extruder to prepare the noodle belt (noodle belt extrusion); and (3) a small dough lump is extruded by an extruding machine such as an extruder under ordinary pressure, and the small dough lump is prepared into the noodle belt by using a shaping roll (small dough lump extrusion). Subsequently, the noodle belt prepared by any of the methods (1) to (3) is rolled out into a desired thickness by using a rolling roll, the noodle belt having been rolled out is cut with a cutting blade roll to obtain raw noodle strings, the thus obtained raw noodle strings are subjected to gelatinization and the like, and then dried by frying. In order to inhibit formation of a layered gluten network structure, for example, the number of times of performing the rolling by using the rolling roll is preferably once or twice, which is smaller than the General number of times, that is, three times to eight times. It is noted that the method for producing the fried noodles of the present invention is not limited to the aforementioned method, but any method can be employed as long as the formation of pores within a noodle string is inhibited in the production method.

Next, a cross sectional structure of each noodle string of the instant fried noodles of the present invention will be described.

Figure 1:
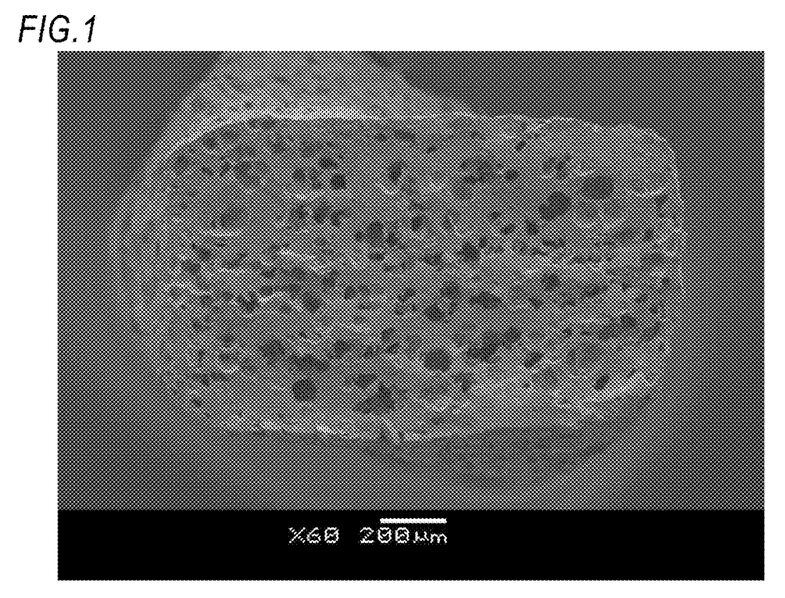
FIG. 1 is an electron micrograph of a cross section of a noodle string included in instant fried noodles produced in Example 1-1 (a normal pressure mixer, usual compounding, rolled out once).
Figure 2:
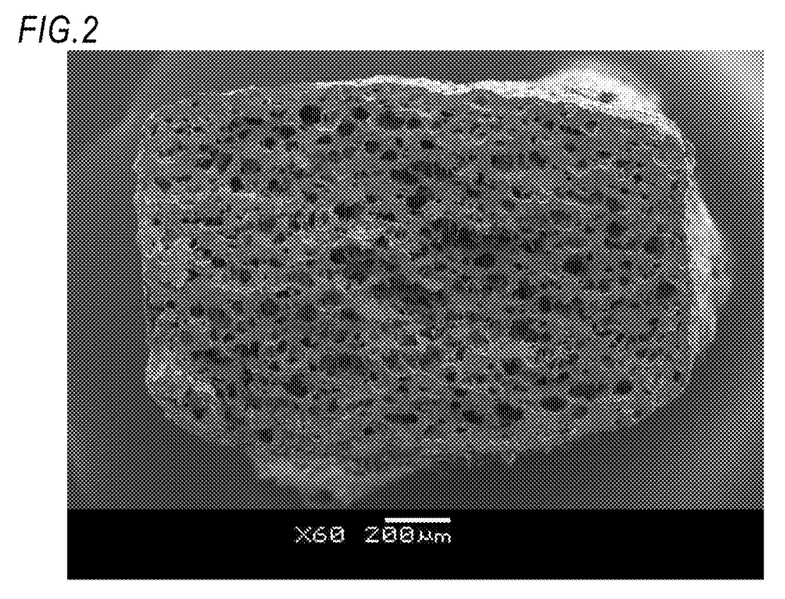
FIG. 2 is an electron micrograph of a cross section of a noodle string included in instant fried noodles produced in Example 1-2 (a normal pressure mixer, usual compounding, rolled out twice).
Figure 3:
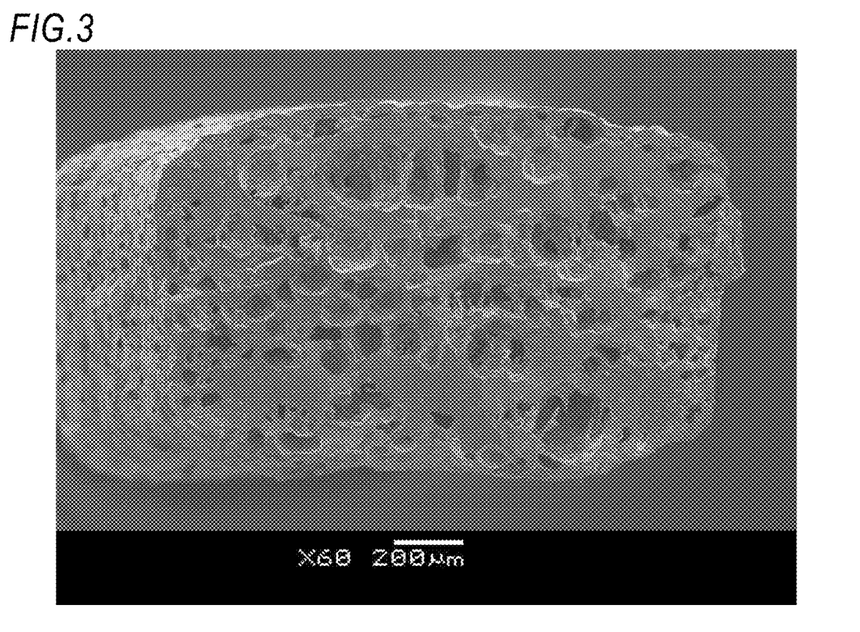
FIG. 3 is an electron micrograph of a cross section of a noodle string included in instant fried noodles produced in Example 1-3 (a vacuum mixer, usual compounding, rolled out once).
Figure 4:
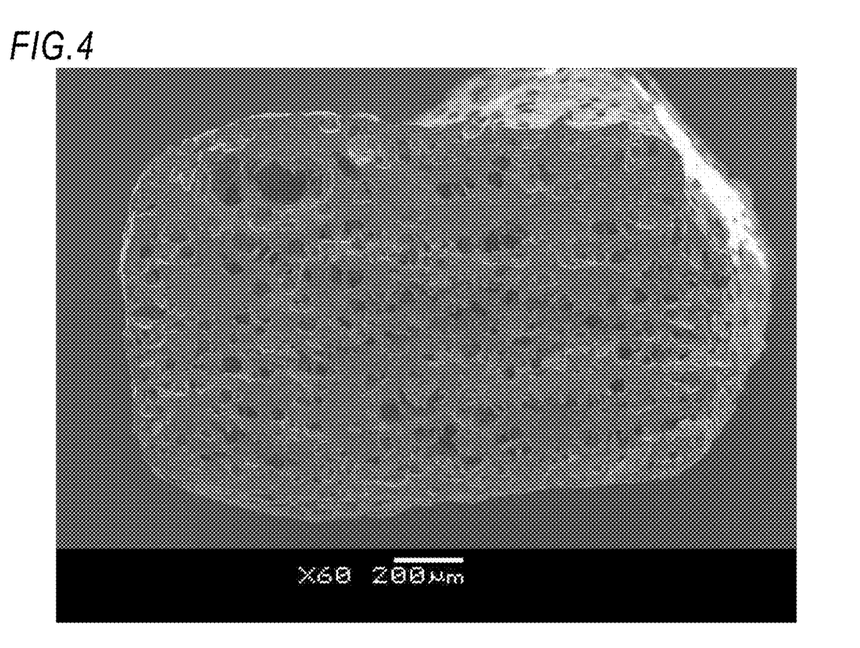
FIG. 4 is an electron micrograph of a cross section of a noodle string included in instant fried noodles produced in Example 1-4 (a vacuum mixer, usual compounding, rolled out twice).
Figure 5:
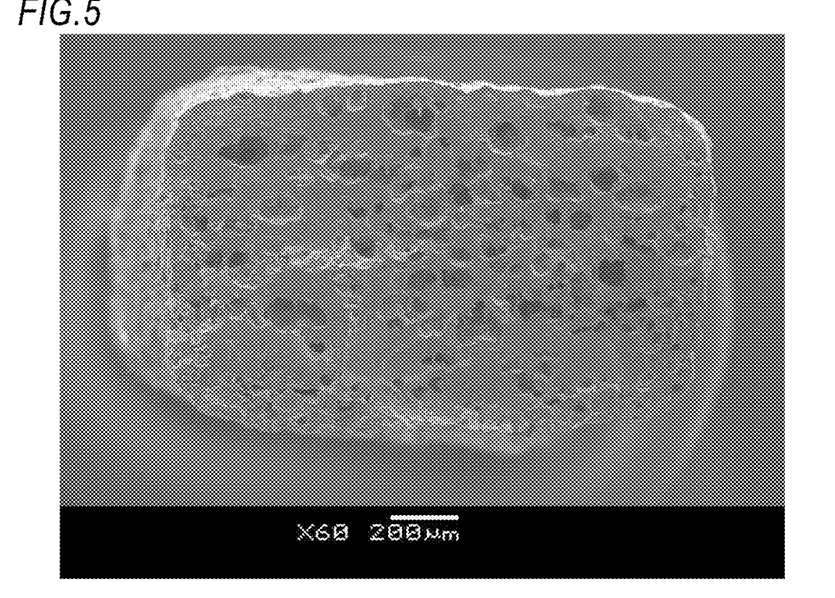
FIG. 5 is an electron micrograph of a cross section of a noodle string included in instant fried noodles produced in Example 2-1 (a normal pressure mixer, noodle belt extrusion, rolled out once).
Figure 6:
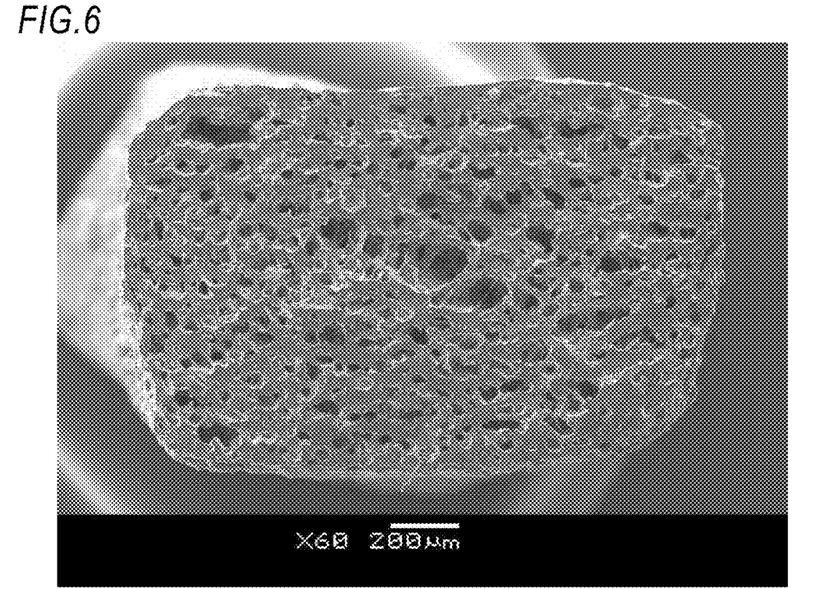
FIG. 6 is an electron micrograph of a cross section of a noodle string included in instant fried noodles produced in Example 2-2 (a normal pressure mixer, noodle belt extrusion, rolled out twice).
Figure 7:
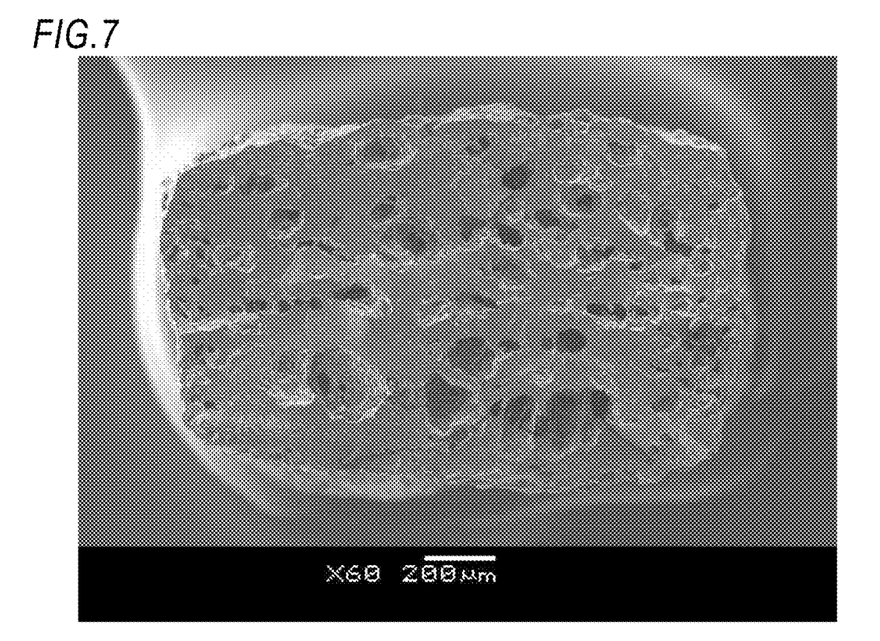
FIG. 7 is an electron micrograph of a cross section of a noodle string included in instant fried noodles produced in Example 2-3 (a vacuum mixer, noodle belt extrusion, rolled out once).
Figure 8:
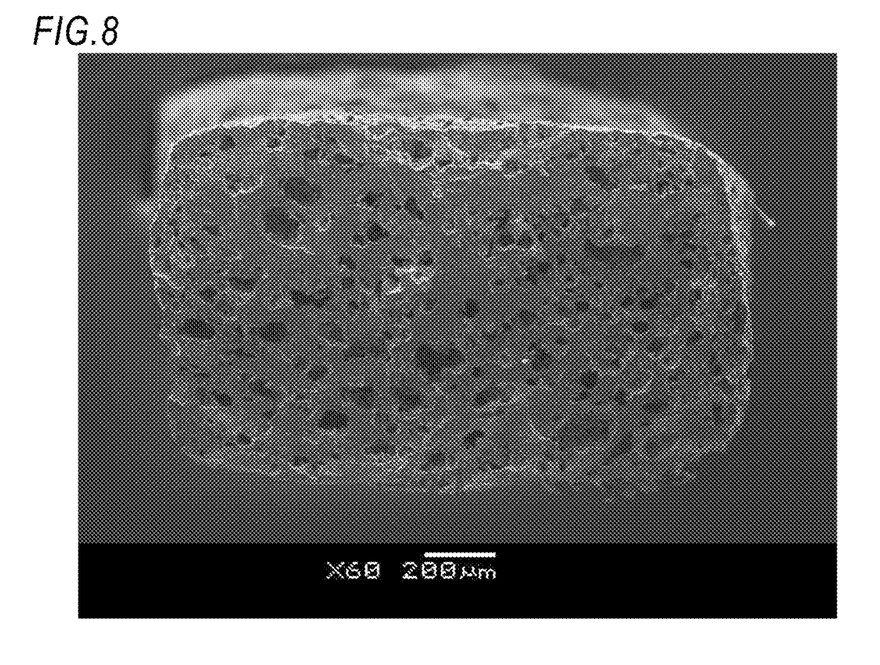
FIG. 8 is an electron micrograph of a cross section of a noodle string included in instant fried noodles produced in Example 2-4 (a vacuum mixer, noodle belt extrusion, rolled out twice).
Figure 9:
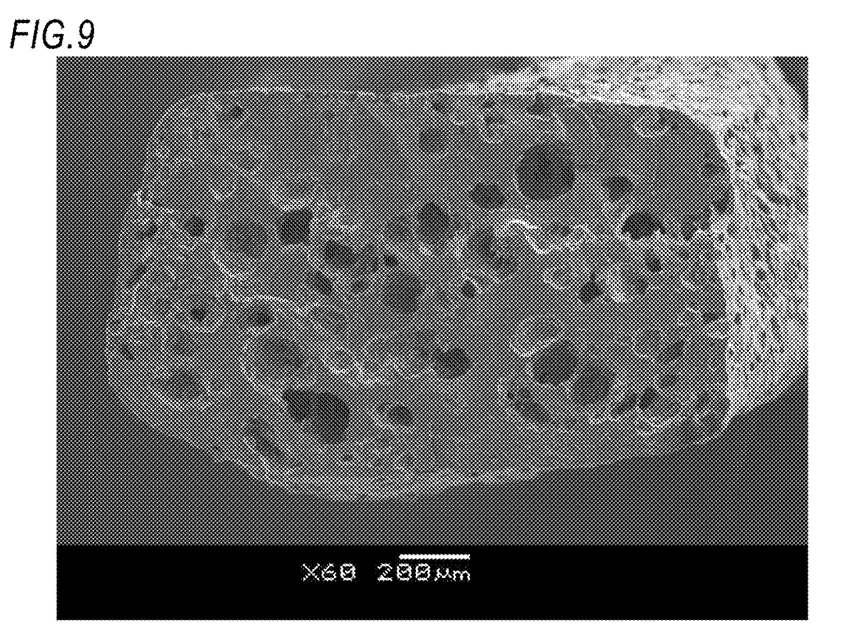
FIG. 9 is an electron micrograph of a cross section of a noodle string included in instant fried noodles produced in Example 3-1 (a normal pressure mixer, small dough lump extrusion, rolled out once).
Figure 10:
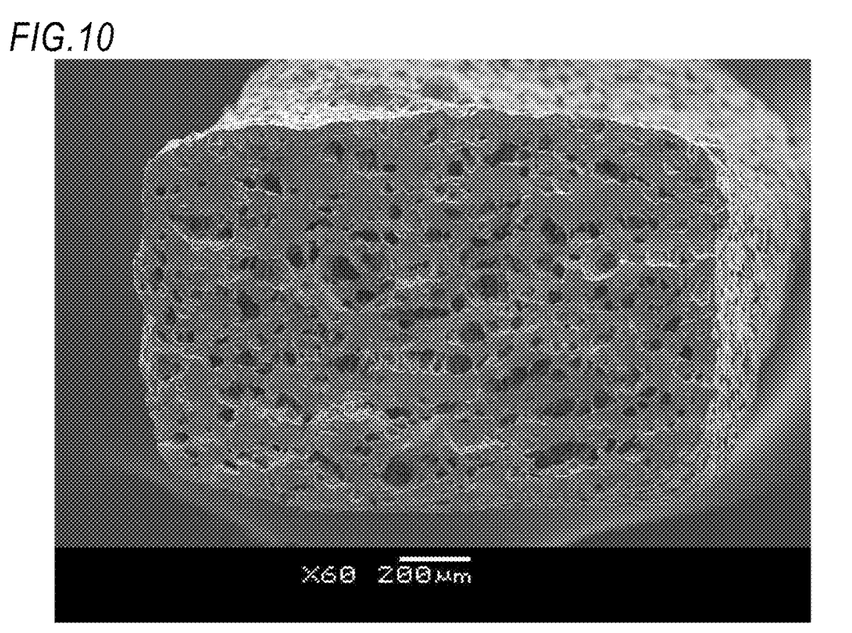
FIG. 10 is an electron micrograph of a cross section of a noodle string included in instant fried noodles produced in Example 3-2 (a normal pressure mixer, small dough lump extrusion, rolled out twice).
Figure 11:
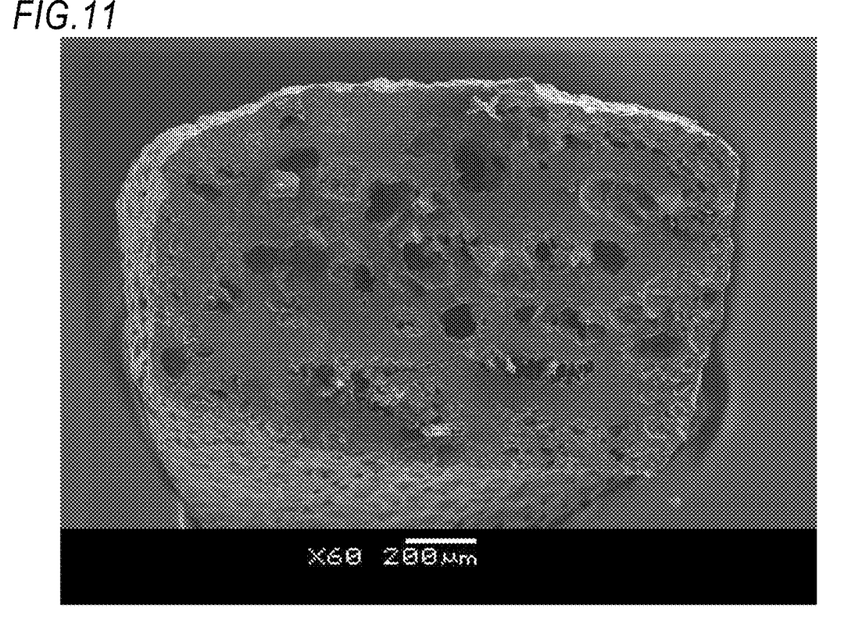
FIG. 11 is an electron micrograph of a cross section of a noodle string included in instant fried noodles produced in Example 3-3 (a vacuum mixer, small dough lump extrusion, rolled out once).
Figure 12:
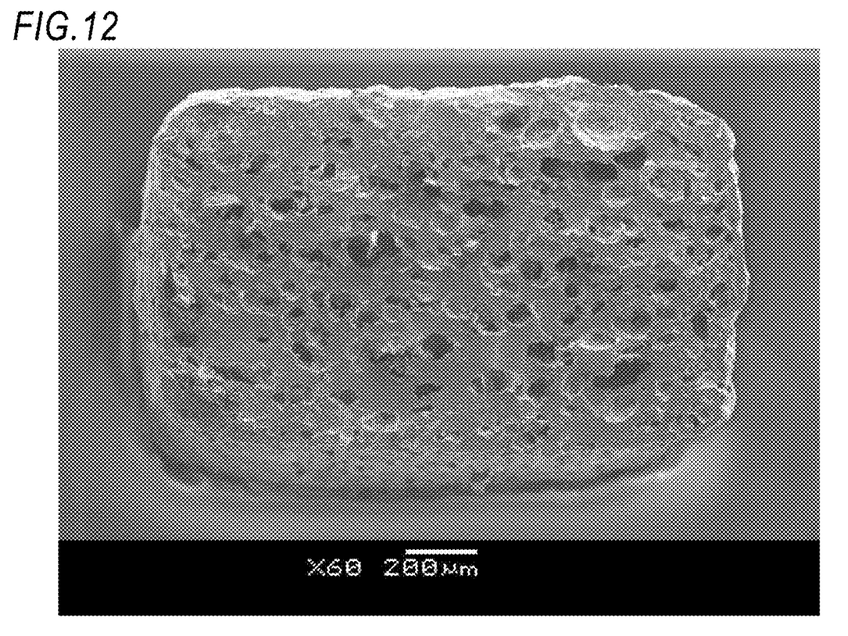
FIG. 12 is an electron micrograph of a cross section of a noodle string included in instant fried noodles produced in Example 3-4 (a vacuum mixer, small dough lump extrusion, rolled out twice).
Figure 13:
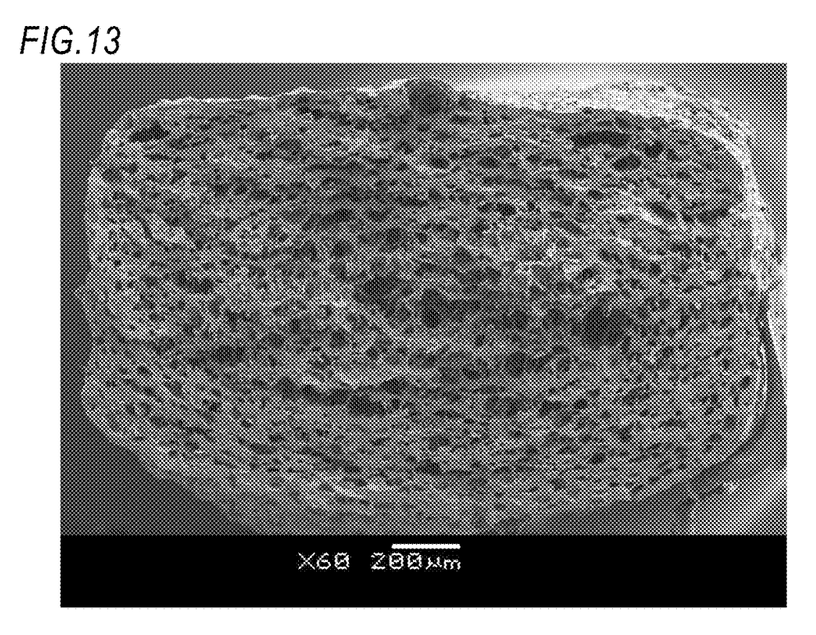
FIG. 13 is an electron micrograph of a cross section of a noodle string included in instant fried noodles produced in Comparative Example 1 (a normal pressure mixer, usual compounding, rolled out six times).

FIGS. 1 to 12 are electron micrographs of cross sections of noodle strings of the instant fried noodles of the present invention cut in a direction perpendicular to the lengthwise direction of the noodle strings, and FIG. 13 is an electron micrograph of a cross section of a noodle string of fried noodles produced by a conventional production method in which a noodle belt prepared by usual compounding is rolled out six times. Each cross sectional structure was observed by using an electron microscope (JSM-6380LA, 60-fold magnification) after subjecting the noodle string to an ether degreasing process.

In producing the instant fried noodles by the conventional production method, the rolling is performed a large number of times (of, for example, six times) in a state of a noodle belt, and hence, a gluten network structure formed within a noodle string is drawn into the shape of a layer. Therefore, bubbling of moisture caused within the noodle string in frying is physically suppressed by the layered gluten network structure, and hence, a large number of fine pores are formed within the noodle string as illustrated in FIG. 13. Since such a spongiform porous structure absorbs a large amount of an oil in frying, a fat or oil content in the entire instant fried noodles is unavoidably increased.

On the other hand, as illustrated in FIGS. 1 to 12, the instant fried noodles of the present invention has a characteristic that the number of pores present in a cross section of each noodle string cut in the direction perpendicular to the lengthwise direction of the noodle string is smaller and porosity (the ratio of a total area of pores to the area of the cross section of the noodle string) is lower than in the instant fried noodles produced by the conventional method (FIG. 13). This is probably because a layered gluten network structure is difficult to be formed in the instant fried noodles of the present invention, and hence moisture can freely bubble in frying.

The number of pores of 100 $\mu m^2$ or larger present per unit area of 1 $mm^2$ in the cross section of the noodle string of the instant fried noodles of the present invention is 250 or less, and more preferably 150 or less. The porosity is 25% or less, and more preferably 19% or less. The average porosity (the ratio of an average area of pores of 100 $\mu m^2$ or larger to the area of the cross section of the noodle string) is 0.14% or less.

Since the instant fried noodles of the present invention have the above-described porous structure, a small amount of an oil component remains within the pores in frying. If the number of pores of 100 $\mu m^2$ or larger present per unit area of 1 $mm^2$ the cross section of the noodle string of the instant fried noodles of the present invention is 250 or less, the fat or oil content can be 15% or less, and if the number of pores of 100 $\mu m^2$ or larger present per unit area of 1 $mm^2$ is 150 or less, the fat or oil content can be 13% or less.

An example of a method for producing the instant fried noodles of the present invention will now be described. It is noted that the production method for the instant fried noodles of the present invention is not limited to the following method.

1. Raw Material Formulation in the instant fried noodles of the present invention, general materials of instant noodles can be used. Specifically, a single one of or a mixture of flours such as wheat flour, buckwheat flour and rice flour, various starches such as potato starch, tapioca starch and corn starch, and processed starch of any of these may be used as a raw material powder.

2. Preparation of Dough

The preparation of dough according to the present invention can be performed by an ordinary method. Specifically, a normal pressure mixer (a batch mixer or a flow jet mixer), a vacuum mixer or the like may be used for homogeneously mixing/kneading the noodle material powder and kneading water, and thus, crumb-like dough may be prepared.

3. Preparation of Noodle Belt

The thus prepared dough is used for preparing a noodle belt. The noodle belt of the present invention is prepared by any of the following methods (1) to (3): (1) The dough is formed into a crude noodle belt by using a usual shaping roll and the resultant is allowed to pass through a compound roll to prepare the noodle belt (usual compounding); (2) the dough is extruded under ordinary pressure by using an extruding machine such as an extruder to prepare the noodle belt (noodle belt extrusion); and (3) a small dough lump is extruded by using an extruding machine such as an extruder under ordinary pressure, and the small dough lump is prepared into the noodle belt by using a shaping roll (small dough lump extrusion).

4. Rolling and Cutting

Next, the prepared noodle belt is rolled out into a desired thickness by using a rolling roll. In order to inhibit formation of a layered gluten network structure in noodles, the number of times of performing the rolling is preferably once or twice, which is smaller than the general number of times, that is, three times to eight times.

If the number of times of performing the rolling is twice, the rolling degree of the rolling is not especially limited, and the noodle belt may be rolled out by 90% or more at a time in the first rolling, followed by fine adjustment to the desired thickness performed in the second rolling, or the desired thickness may be gradually obtained with the rolling degree equally divided in accordance with the number of times of performing the rolling. The noodle belt having the desired thickness is cut with a cutting blade roll, and thus, raw noodle strings are obtained.

5. Gelatinizing Step

Subsequently, the thus obtained raw noodle strings are gelatinized by steaming and/or boiling by an ordinary method. As a steaming method, heating can be performed not only with saturated water vapor but also with superheated water vapor.

6. Flavoring Step

In the present invention, the thus gelatinized noodle strings may be flavored by adherence of a seasoning liquid (a liquid seasoning) to the noodle strings by spraying, dipping or the like. The flavoring step is not always necessary and may be omitted.

7. Cut and Input

Subsequently, the noodle strings are cut into a length of 20 to 50 cm corresponding to a single meal amount. The cut noodle strings are input to a metal frying/drying device including a lid and a container as a fry retainer.

8. Frying/Drying Step

The fry retainer containing the noodles therein is moved in a metal tank, designated as a fryer, holding a cooking oil heated to about 130 to 160° C., so as to dip the noodles in the oil, and thus, moisture in the noodles is evaporated and the noodles are dried. Examples of the cooking oil used here include a palm oil and lard. The noodles are dried so as to have a moisture of 1 to 8% by weight after the frying/drying step.

9. Cooling Step

After the frying/drying step, the lid is removed and a noodle lump is taken out of the container. The noodle lump thus taken out is cooled for a prescribed period of time to obtain instant fried noodles.

10. Other Steps

The cooled instant fried noodles are transferred to a packaging step to be packed in a cup or a bag together with soup and ingredients, and the resultant is sold as a product of the instant fried noodles.

In this manner, when the number of pores and the porosity are suppressed to fall in the prescribed ranges, instant fried noodles having a low fat or oil content can be provided.

EXAMPLES

Now, the present invention will be described in more details with reference to examples.

Experiment 1

<Examination on Usually Compounded Noodle Belt>

Example 1-1

Powders of 900 g of wheat flour and 100 g of starch were mixed, and to the resultant, 340 ml of kneading water containing 15 g of salt, 2.3 g of kansui and 0.4 g of polyphosphate salt dissolved therein was added, and the resultant mixture was mixed/kneaded with a normal pressure twin screw mixer for 3 minutes to prepare crumb-like dough. At this point, the dough had a moisture of 35.0%.

The thus prepared dough was prepared into a crude noodle belt using a usual shaping roll under normal pressure, and two crude noodle belts thus prepared were compounded using the shaping roll again to prepare a noodle belt. At this point, the noodle belt had a thickness of 8 mm.

The thus prepared noodle belt was rolled out from the thickness of 8 mm to a thickness of 1 mm at a time using a six-sun (about 18 cm) roll (the number of times of performing the rolling: once). Besides, a rolling speed was set to 0.85 m/min, and the noodle belt thus rolled out was formed into noodle strings using a cutting blade roll of a #20 square blade.

The noodle strings thus cut were immediately steamed for 2 minutes in a steam chamber into which saturated water vapor was supplied at 240 kg/h.

The steamed noodle strings were dipped for 5 seconds in a liquid seasoning containing, per 1 L, 90 g of salt, 13.5 g of glutamic acid, 10 ml of soy sauce and 30 g of a meat extract dissolved therein, and thereafter, the resultant noodle strings were drawn and cut into a length of 30 cm.

The cut noodle strings thus flavored were input to a cup-shaped metal container, which had an upper surface diameter of 87 mm, an underside diameter of 72.5 mm and a height of 60 mm, and had a large number of small holes of a diameter of 2.9 mm on the underside, in an amount corresponding to a weight of 100 g, the container was then covered with a metal lid also having a large number of small holes of a diameter of 2.9 mm, and the resultant was dipped in a fryer heated to 150° C. for drying by frying.

Example 1-2

A sample of fried noodles was produced in the same manner as in Example 1-1 except that the number of times of performing the rolling was changed to twice, so that a noodle belt with a thickness of 8 mm could be rolled out to a thickness of 1.5 mm in the first rolling and then to a thickness of 1 mm in the second rolling.

Example 1-3

A sample of fried noodles was produced in the same manner as in Example 1-1 except that a vacuum mixer was used, instead of the normal pressure twin screw mixer, for mixing/kneading for 15 minutes.

Example 1-4

A sample of fried noodles was produced in the same manner as in Example 1-1 except that a vacuum mixer was used, instead of the normal pressure twin screw mixer, for mixing/kneading for 15 minutes, and that the number of times of performing the rolling was changed to twice, so that a noodle belt with a thickness of 8 mm could be rolled out to a thickness of 1.5 mm in the first rolling and then to a thickness of 1 mm in the second rolling.

Comparative Example 1

A sample of fried noodles was produced in the same manner as in Example 1-1 except that the number of times of performing the rolling was changed to six times, so that a noodle belt with a thickness of 8 mm could be rolled out to a thickness of 4 mm in the first rolling, to a thickness of 3 mm in the second rolling, to a thickness of 2.5 mm in the third rolling, to a thickness of 2 mm in the fourth rolling, to a thickness of 1.5 mm in the fifth rolling, and to a thickness of 1 mm in the sixth rolling, and that the rolling speed of the rolling roll was set to 18.5 m/min.

Experiment 2

<Preparation of Noodle Belt by Extruder>

Example 2-1

Powders of 900 g of wheat flour and 100 g of starch were mixed, and to the resultant, 340 ml of kneading water containing 15 g of salt, 2.3 g of kansui and 0.4 g of polyphosphate salt dissolved therein was added, and the resultant mixture was mixed/kneaded with a normal pressure twin screw mixer for 3 minutes to prepare crumb-like dough.

The thus prepared dough was extruded under normal pressure by using an extruder to prepare a noodle belt having a thickness of 8 mm.

The thus prepared noodle belt was rolled out from the thickness of 8 mm to a thickness of 1 mm at a time using a six-sun (about 18 cm) roll (the number of times of performing the rolling: once). A rolling speed was set to 0.85 m/min, and the noodle belt thus rolled out was formed into noodle strings using a cutting blade roll of a #20 square blade.

Thereafter, the production was performed in the same manner as in Example 1-1.

Example 2-2

A sample of fried noodles was produced in the same manner as in Example 2-1 except that the number of times of performing the rolling was changed to twice, so that a noodle belt with a thickness of 8 mm could be rolled out to a thickness of 1.5 mm in the first rolling and then to a thickness of 1 mm in the second rolling.

Example 2-3

A sample of fried noodles was produced in the same manner as in Example 2-1 except that a vacuum mixer was used, instead of the normal pressure twin screw mixer, for mixing/kneading for 15 minutes.

Example 2-4

A sample of fried noodles was produced in the same manner as in Example 2-1 except that a vacuum mixer was used, instead of the normal pressure twin screw mixer, for mixing/kneading for 15 minutes, and that the number of times of performing the rolling was changed to twice, so that a noodle belt with a thickness of 8 mm could be rolled out to a thickness of 1.5 mm in the first rolling and then to a thickness of 1 mm in the second rolling.

(Experiment 3)
<Preparation of Noodle Belt Using Shaping Roll after Preparing Small Dough Lump Using Extruder>

Example 3-1

Powders of 900 g of wheat flour and 100 g of starch were mixed, and to the resultant, 340 ml of kneading water containing 15 g of salt, 2.3 g of kansui and 0.4 g of polyphosphate salt dissolved therein was added, and the resultant mixture was mixed/kneaded with a normal pressure twin screw mixer for 3 minutes to prepare crumb-like dough.

The thus prepared dough was extruded under normal pressure by using an extruder to prepare a small dough lump having a diameter of 20 mm and a length of 20 mm, which was prepared into a crude noodle belt using a shaping roll, and two crude noodle belts thus prepared were compounded using the shaping roll again to prepare a noodle belt. At this point, the noodle belt had a thickness of 8 mm.

The thus prepared noodle belt was rolled out from the thickness of 8 mm to a thickness of 1 mm at a time using a six-sun (about 18 cm) roll (the number of times of performing the rolling: once). A rolling speed was set to 0.85 m/min, and the noodle belt thus rolled out was formed into noodle strings using a cutting blade roll of a #20 square blade.

Thereafter, the production was performed in the same manner as in Example 1-1.

Example 3-2

A sample of fried noodles was produced in the same manner as in Example 3-1 except that the number of times of performing the rolling was changed to twice, so that a noodle belt with a thickness of 8 mm could be rolled out to a thickness of 1.5 mm in the first rolling and then to a thickness of 1 mm in the second rolling.

Example 3-3

A sample of fried noodles was produced in the same manner as in Example 3-1 except that a vacuum mixer was used, instead of the normal pressure twin screw mixer, for mixing/kneading for 15 minutes.

Example 3-4

A sample of fried noodles was produced in the same manner as in Example 3-1 except that a vacuum mixer was used, instead of the normal pressure twin screw mixer, for performing mixing/kneading for 15 minutes, and that the number of times of performing the rolling was changed to twice, so that a noodle belt with a thickness of 8 mm could be rolled out to a thickness of 1.5 mm in the first rolling and then to a thickness of 1 mm in the second rolling.

Evaluation of Fat or Oil Content and Characteristic of Porous Structure

The samples of the noodle strings of the instant fried noodles produced in Experiments 1 to 3 were evaluated for the fat or oil content and the presence of blister, and after subjecting the samples to the ether degreasing process, the cross sectional structures of the noodle strings were observed with an electron microscope. The results are shown in Tables 1 and 2 below. The fat or oil content was analyzed by the Soxhlet extraction method after crushing, for uniforming, the fried noodles having been dried by frying. The cross sectional structures were observed with an electron microscope (JSM-6380LA, 60-fold magnification) manufactured by JEOL Ltd., and digital images thus taken were subjected to image analysis using Image-Pro Premier 9.1 manufactured by Media Cybernetics, Inc. The number N of used samples was 5.

In the image analysis, with respect to pores having an area of 100 µm² or larger visually recognizable in each digital image, the number of pores present in the cross section of each noodle string, the number of pores per unit area of 1 mm², porosity (the ratio of a total area of pores to the area of the cross section of the noodle string) (%), average porosity (the ratio of an average area of pores to the area of the cross section of the noodle string) (%), and maximum porosity (the ratio of an area of the largest pore present in the cross section of the noodle string to the area of the cross section of the noodle string) (2) were obtained.

As shown in Tables 1 and 2, the numbers of the pores present in the cross sections of the noodle strings of the instant fried noodles of Comparative Example 1 were 574 to 646, the numbers of pores per unit area of 1 mm² were 282 to 332, the porosity was 25.9% to 28.8%, and the average porosity was 0.04% to 0.05%, and on the contrary, the numbers of the pores present in the cross sections of the noodle strings of the instant fried noodles of Examples 1-1 to 3-4 were 101 to 403, the numbers of the pores per unit area of 1 mm² were 71 to 234, the porosity was 7.3% to 24.6%, and the average porosity was 0.03% to 0.14%.

Besides, in the instant fried noodles of Examples 1-1, 1-3, 2-1, 2-3, 3-1, 3-3 and 3-4, in which the fat or oil content is 13% or less, the numbers of pores present in the cross section of the noodle strings were 101 to 239, the numbers of pores per unit area of 1 mm² were 71 to 147, the porosity was 8.6% to 18.2%, and the average porosity was 0.06% to 0.14%.

In the instant fried noodles of Comparative Example 1, since a layered gluten network structure is firmly formed within the noodle string, the bubbling of moisture within the noodle string in frying is suppressed by the layered gluten network structure, and hence, a large number of fine pores are formed within the noodle string.

On the other hand, in the instant fried noodles of Examples 1-1 to 3-4, since the formation of a layered gluten network structure is inhibited, the numbers of pores present in the cross sections of the noodle strings, the numbers of pores per unit area of 1 mm², and the porosity were all smaller than those of Comparative Example 1.

Besides, it is understood that the average porosity is larger in the instant fried noodles of Examples 1-1, 1-3, 2-1, 2-3, 3-1, 3-3 and 3-4 than in the instant fried noodles of Comparative Example 1. This is probably because the layered gluten network structure is more difficult to be formed in the instant fried noodles of Examples 1-1, 1-3, 2-1, 2-3, 3-1, 3-3 and 3-4 than in the instant fried noodles of Examples 1-2, 1-4, 2-2, 2-4 and 3-2, and hence the moisture within the noodle strings is more freely bubbled and the average sizes of individual pores are increased. On the other hand, the numbers of pores present in the cross sections of the noodle strings, the numbers of pores per unit area of 1 mm², and the porosity are small, and therefore, the fat or oil content can be reduced by 4% or more as compared with that of Comparative Example 1.

Furthermore, in the instant fried noodles of Examples 1-1 to 3-4, the area of the largest pore present in the cross section of each noodle string was 5% or less of the area of the cross section of the noodle string, and no blister was caused on the surface of the noodle string.

The fat or oil content was 17.2% in the instant fried noodles of Comparative Example 1 but was 11.4% to 14.8% in the instant fried noodles of Examples 1-1 to 3-4, and was particularly 11.4% to 13% in the instant fried noodles of Examples 1-1, 1-3, 2-1, 2-3, 3-1, 3-3 and 3-4. Thus, when the number of pores formed within a noodle string per unit area and the porosity are reduced, instant fried noodles having a low fat or oil content can be provided.

In this manner, according to the present invention, the number of pores per unit area and porosity in a porous structure within a noodle string are reduced, so as to provide instant fried noodles having a fat or oil content reduced without impairing the texture and the appearance.

TABLE 1

| | Conditions | Number of times of Rolling | Oil or Fat Content | Sample | Number of Pores | Number of Pores per unit area (1 mm²) | Porosity | Average Porosity | Maximum Porosity | Blister |
|---|---|---|---|---|---|---|---|---|---|---|
| Example 1-1 | Usual Compounding Normal Pressure Mixer | 1 | 13.0% | 1 | 183 | 132 | 15.7% | 0.09% | 0.6% | none |
| | | | | 2 | 184 | 121 | 18.2% | 0.10% | 2.3% | none |
| | | | | 3 | 206 | 141 | 16.5% | 0.08% | 1.1% | none |
| | | | | 4 | 239 | 147 | 17.5% | 0.07% | 0.6% | none |
| | | | | 5 | 231 | 145 | 13.0% | 0.08% | 0.8% | none |
| | | | | Average | 209 | 137 | 17.2% | 0.08% | 1.1% | |
| Example 1-2 | Usual Compounding Normal Pressure Mixer | 2 | 14.1% | 1 | 381 | 216 | 22.3% | 0.06% | 0.7% | none |
| | | | | 2 | 403 | 234 | 24.0% | 0.06% | 1.5% | none |
| | | | | 3 | 392 | 225 | 20.1% | 0.05% | 0.4% | none |
| | | | | 4 | 319 | 203 | 24.6% | 0.08% | 1.5% | none |
| | | | | 5 | 289 | 173 | 20.8% | 0.07% | 0.9% | none |
| | | | | Average | 357 | 210 | 22.4% | 0.06% | 1.0% | |
| Example 1-3 | Usual Compounding Vacuum Mixer | 1 | 12.4% | 1 | 231 | 146 | 17.2% | 0.07% | 1.2% | none |
| | | | | 2 | 203 | 132 | 14.9% | 0.07% | 0.9% | none |
| | | | | 3 | 203 | 130 | 16.8% | 0.08% | 1.1% | none |
| | | | | 4 | 217 | 140 | 12.4% | 0.06% | 1.3% | none |
| | | | | 5 | 186 | 129 | 15.2% | 0.08% | 1.8% | none |
| | | | | Average | 208 | 135 | 15.3% | 0.07% | 1.3% | |
| Example 1-4 | Usual Compounding Vacuum Mixer | 2 | 13.5% | 1 | 323 | 189 | 14.5% | 0.04% | 1.2% | none |
| | | | | 2 | 221 | 186 | 15.8% | 0.05% | 1.0% | none |
| | | | | 3 | 384 | 211 | 15.1% | 0.04% | 1.8% | none |
| | | | | 4 | 280 | 162 | 13.2% | 0.05% | 0.9% | none |
| | | | | 5 | 293 | 189 | 17.2% | 0.06% | 0.8% | none |
| | | | | Average | 320 | 187 | 15.1% | 0.05% | 1.1% | |

TABLE 1-continued

| | Conditions | Number of times of Rolling | Oil or Fat Content | Sample | Number of Pores | Number of Pores per unit area (1 mm$^2$) | Porosity | Average Porosity | Maximum Porosity | Blister |
|---|---|---|---|---|---|---|---|---|---|---|
| Comparative Example 1 | Usual Compounding Normal Pressure Mixer | 6 | 17.2% | 1 | 637 | 295 | 27.0% | 0.04% | 3.0% | none |
| | | | | 2 | 635 | 289 | 28.8% | 0.05% | 1.9% | none |
| | | | | 3 | 575 | 282 | 28.5% | 0.05% | 2.0% | none |
| | | | | 4 | 574 | 291 | 27.2% | 0.05% | 3.2% | none |
| | | | | 5 | 646 | 332 | 25.9% | 0.04% | 3.0% | none |
| | | | | Average | 613 | 298 | 27.5% | 0.04% | 2.6% | |

TABLE 2

| | Condition | Number of times of Rolling | Oil or Fat Content | Sample | Number of Pores | Number of Pores per unit area (1 mm$^2$) | Porosity | Average Porosity | Maximum Porosity | Blister |
|---|---|---|---|---|---|---|---|---|---|---|
| Example 2-1 | Noodle Belt Extrusion Normal Pressure Mixer | 1 | 11.4% | 1 | 165 | 111 | 14.0% | 0.08% | 0.6% | none |
| | | | | 2 | 160 | 103 | 10.2% | 0.06% | 0.6% | none |
| | | | | 3 | 138 | 95 | 12.9% | 0.09% | 1.2% | none |
| | | | | 4 | 180 | 110 | 13.3% | 0.07% | 0.9% | none |
| | | | | 5 | 146 | 102 | 11.6% | 0.08% | 1.4% | none |
| | | | | Average | 158 | 104 | 12.4% | 0.08% | 0.9% | |
| Example 2-2 | Noodle Belt Extrusion Normal Pressure Mixer | 2 | 14.5% | 1 | 249 | 144 | 8.7% | 0.04% | 0.3% | none |
| | | | | 2 | 272 | 151 | 9.7% | 0.04% | 0.5% | none |
| | | | | 3 | 271 | 156 | 11.5% | 0.04% | 0.6% | none |
| | | | | 4 | 246 | 132 | 7.3% | 0.03% | 0.3% | none |
| | | | | 5 | 250 | 128 | 8.9% | 0.04% | 1.2% | none |
| | | | | Average | 258 | 143 | 9.2% | 0.04% | 0.6% | |
| Example 2-3 | Noodle Belt Extrusion Vacuum Mixer | 1 | 12.0% | 1 | 146 | 100 | 3.6% | 0.06% | 0.5% | none |
| | | | | 2 | 118 | 81 | 10.6% | 0.09% | 1.0% | none |
| | | | | 3 | 139 | 97 | 11.5% | 0.08% | 2.2% | none |
| | | | | 4 | 152 | 93 | 11.4% | 0.07% | 2.6% | none |
| | | | | 5 | 174 | 104 | 13.2% | 0.08% | 2.4% | none |
| | | | | Average | 146 | 95 | 11.1% | 0.08% | 1.8% | |
| Example 2-4 | Noodle Belt Extrusion Vacuum Mixer | 2 | 13.1% | 1 | 201 | 128 | 10.6% | 0.05% | 1.2% | none |
| | | | | 2 | 241 | 143 | 11.5% | 0.05% | 0.8% | none |
| | | | | 3 | 236 | 153 | 12.0% | 0.05% | 0.6% | none |
| | | | | 4 | 216 | 141 | 11.9% | 0.06% | 1.3% | none |
| | | | | 5 | 221 | 134 | 13.8% | 0.06% | 1.7% | none |
| | | | | Average | 223 | 140 | 12.0% | 0.05% | 1.1% | |
| Example 3-1 | Small Dough Lump Extrusion Normal Pressure Mixer | 1 | 13.0% | 1 | 173 | 113 | 12.7% | 0.07% | 1.0% | none |
| | | | | 2 | 189 | 111 | 11.8% | 0.06% | 0.5% | none |
| | | | | 3 | 169 | 95 | 15.4% | 0.09% | 1.3% | none |
| | | | | 4 | 204 | 130 | 14.9% | 0.07% | 1.0% | none |
| | | | | 5 | 198 | 117 | 13.7% | 0.07% | 0.9% | none |
| | | | | Average | 187 | 113 | 13.7% | 0.07% | 0.9% | |
| Example 3-2 | Small Dough Lump Extrusion Normal Pressure Mixer | 2 | 14.8% | 1 | 365 | 205 | 12.2% | 0.03% | 0.4% | none |
| | | | | 2 | 340 | 183 | 13.0% | 0.04% | 0.7% | none |
| | | | | 3 | 299 | 179 | 17.6% | 0.06% | 0.6% | none |
| | | | | 4 | 342 | 197 | 14.7% | 0.04% | 0.4% | none |
| | | | | 5 | 369 | 196 | 14.1% | 0.04% | 1.1% | none |
| | | | | Average | 343 | 193 | 14.3% | 0.04% | 0.6% | |
| Example 3-3 | Small Dough Lump Extrusion Vacuum Mixer | 1 | 12.6% | 1 | 116 | 75 | 9.5% | 0.08% | 1.0% | none |
| | | | | 2 | 104 | 72 | 12.1% | 0.12% | 2.9% | none |
| | | | | 3 | 103 | 78 | 11.5% | 0.11% | 1.6% | none |
| | | | | 4 | 101 | 71 | 14.2% | 0.14% | 2.0% | none |
| | | | | 5 | 106 | 76 | 9.8% | 0.09% | 1.0% | none |
| | | | | Average | 106 | 74 | 11.4% | 0.11% | 1.7% | |
| Example 3-4 | Small Dough Lump Extrusion Vacuum Mixer | 2 | 13.0% | 1 | 148 | 98 | 12.0% | 0.08% | 1.5% | none |
| | | | | 2 | 136 | 85 | 8.1% | 0.06% | 0.5% | none |
| | | | | 3 | 119 | 78 | 8.7% | 0.07% | 0.4% | none |
| | | | | 4 | 154 | 106 | 11.6% | 0.08% | 0.4% | none |
| | | | | 5 | 136 | 91 | 7.5% | 0.06% | 0.6% | none |
| | | | | Average | 139 | 92 | 9.6% | 0.07% | 0.7% | |

The invention claimed is:

1. Instant fried noodles having a porous structure,
wherein the porous structure comprises a plurality of pores containing fat or oil,
a number of the pores having a size in a range of 100 μm² or larger present per unit area of 1 mm² in a cross section of a noodle string of the instant fried noodles is in a range of 250 or less,
a ratio of a total area of the pores having the size in the range of 100 μm² or larger present in the cross section of the noodle string relative to an area of the cross section of the noodle string is in a range of 25% or less,
a ratio of an average area per the pore having the size in the range of 100 μm² or larger present in the cross section of the noodle string of the instant fried noodles relative to the area of the cross section of the noodle string is in a range from 0.03% to 0.14%,
a content of the fat or oil in the noodle string is in a range of 15% or less, and
the noodle string is a fried string of a raw noodle string, and
wherein the raw noodle string is made of dough comprising: wheat flour, starch, salt, kansui, and polyphosphate salt.

2. Instant fried noodles having a porous structure,
wherein the porous structure comprises a plurality of pores containing fat or oil, and
a number of the pores having a size in a range of 100 μm² or larger present per unit area of 1 mm² in a cross section of a noodle string of the instant fried noodles is in a range of 150 or less,
a ratio of a total area of the pores having the size in the range of 100 μm² or larger present in the cross section of the noodle string relative to an area of the cross section of the noodle string is in a range of 19% or less,
a content of the fat or oil in the noodle string is in a range of 13% or less, and
the noodle string is a fried string of a raw noodle string, and
wherein the raw noodle string is made of dough comprising: wheat flour, starch, salt, kansui, and polyphosphate salt.

3. The instant fried noodles according to claim 2,
wherein a ratio of an average area per the pore having the size in the range of 100 μm² or larger present in the cross section of the noodle string of the instant fried noodles relative to the area of the cross section of the noodle string is in a range of 0.14% or less.

4. The instant fried noodles according to claim 2,
wherein the ratio of an average area per the pore having the size in the range of 100 μm² or larger is in a range from 0.06% to 0.14%.

* * * * *